United States Patent [19]
Katooka et al.

[11] Patent Number: 5,831,240
[45] Date of Patent: Nov. 3, 1998

[54] POWER SUPPLY APPARATUS

[75] Inventors: Masao Katooka, Kawanishi; Toru Arai, Kamigyo-ku; Shigeru Okamoto, Hirakata; Kenzo Danjo, Kyoto-fu; Masaharu Tanaka, Osaka, all of Japan

[73] Assignee: Sansha Electric Manufacturing Company, Limited, Osaka, Japan

[21] Appl. No.: 554,529

[22] Filed: Nov. 7, 1995

[30] Foreign Application Priority Data

| Nov. 8, 1994 | [JP] | Japan | 6-300363 |
| Feb. 23, 1995 | [JP] | Japan | 7-62082 |
| Mar. 31, 1995 | [JP] | Japan | 7-99808 |
| Apr. 27, 1995 | [JP] | Japan | 7-129243 |

[51] Int. Cl.$^6$ ................................ B23K 9/10
[52] U.S. Cl. ........................ 219/130.1; 361/695
[58] Field of Search .......... 219/130.1, 130.51; 361/600, 695, 699; 363/141

[56] References Cited

U.S. PATENT DOCUMENTS

| 4,656,412 | 4/1987 | McLyman . |
| 4,742,430 | 5/1988 | Sawato et al. . |
| 5,170,336 | 12/1992 | Getter et al. ............... 363/141 |
| 5,406,051 | 4/1995 | Lai ........................ 219/130.1 |
| 5,623,191 | 4/1997 | Wieloch ................... 361/600 |

FOREIGN PATENT DOCUMENTS

| A-59200/86 | 6/1986 | Australia . |
| 0420650A2 | 4/1991 | European Pat. Off. . |
| 0 264 135 A2 | 4/1998 | European Pat. Off. . |
| 2 358 776 | 2/1978 | France . |
| 2-141876 | 11/1990 | Japan . |
| 3-46556 | 10/1991 | Japan . |
| 5-161357 | 6/1993 | Japan . |
| 6-178553 | 6/1994 | Japan . |
| 845-250 | 7/1981 | U.S.S.R. . |
| 2 261 125 A | 5/1993 | United Kingdom . |
| 2 262 629 B | 8/1995 | United Kingdom . |
| 2 265 772 B | 8/1995 | United Kingdom . |
| 2 264 795 B | 2/1996 | United Kingdom . |

OTHER PUBLICATIONS

Derwent Abstract Accession No. 94–187497/23, Class T01 and JP 6–125187, Hitachi Ltd.

Primary Examiner—Clifford C. Shaw
Attorney, Agent, or Firm—Duane, Morris & Heckscher LLP

[57] ABSTRACT

A power supply apparatus includes first and second spaced-apart, substantially parallel panels, and a chassis disposed in substantially perpendicular to and between the first and second panels. Opposite edges of the chassis are coupled to the respective ones of the first and second panels to thereby partition the space between the first and second panels into upper and lower regions. A power supply circuit includes heat-generating electric components disposed in the lower region, and non-heat-generating components disposed in the upper region. The chassis has an opening therein and a heat sink is mounted to close the opening in the chassis. A semiconductor module of the power supply circuit is mounted on the surface facing to the upper region of the heat sink.

13 Claims, 11 Drawing Sheets

POWER SUPPLY APPARATUS

This invention relates to a power supply apparatus for, for example, an arc welder, a plasma arc cutter, an electric charger, a noble metal plating apparatus, and the like.

BACKGROUND OF THE INVENTION

One of conventional power supply apparatus is arranged such that commercial AC power is converted into DC by means of an input rectifier circuit and a smoothing capacitor, and, then, the DC power is converted to high frequency power by switching an inverter. The high frequency power is then applied to a voltage transformer to lower the voltage, the voltage-lowered power is then converted into DC power by an output rectifier circuit and a smoothing reactor, and the DC power is applied to a load. In order to maintain the voltage or current to be applied to the load constant, the load voltage or current is detected, and the inverter switching operation is controlled by a control circuit to maintain the load voltage or current constant. In such apparatus, the inverter and the voltage-lowering transformer generate a relatively large amount of heat, and, therefore, they may be called heat-generating components. On the other hand, a component, such as the control circuit, generates a relatively small amount of heat, and, therefore, such components may be called non-heat-generating components.

The inverter may be formed by four switching elements connected to form a bridge. In such a case, in order for the inverter to efficiently dissipate heat therefrom, a system shown in Japanese Unexamined Patent Publication No. HEI 6-178553, is arranged such that two of the four switching elements are built in one module, the remaining two switching elements are built in another module, and the two modules are mounted on a heat sink with heat dissipating fins.

In addition to a plurality of modules, the power supply apparatus requires an input rectifier circuit and an output rectifier circuit. Accordingly, the number of the electric parts used is large so that the power supply apparatus requires complicated circuitry. In addition to requiring complicated circuitry, this system has another disadvantage that because heat-generating components and non-heat-generating components may be disposed close to each other in order to save the space for them, heat generated by the heat-generating components may adversely affect the non-heat-generating components to cause erroneous operation of the latter.

Japanese Examined UM Publication No. HEI 2-41876 and No. HEI 3-46556 disclose power supplies. In these power supplies, two panels are spaced in parallel from each other. The lower ends of the respective panels are coupled by a plurality of crossbars, and a printed circuit board is mounted on the top surfaces of the crossbars. The printed circuit board have a region where heat-generating components, such as the switching circuit and the transformer, are disposed, and a region where non-heat-generating components, such as the control circuit for the switching circuit, are disposed. On the boundary of the two regions, a heat sink with fins is disposed.

The power supply apparatus of this configuration has advantages that the top and bottom surfaces of the printed circuit boards can be inspected with ease because it is mounted on the crossbars, and that heat generated by the heat-generating components is not transferred to the non-heat-generating components because of the heat sink.

There is a limit to the size to which the power supply apparatus as a whole can be made small, because the printed circuit board is disposed on the top surfaces of the crossbars. In addition, because the heat sink which is heavy is disposed on the printed circuit board, the printed circuit board is subject to damage. Particularly, in portable power supply apparatuses, because the apparatus is carried, the printed circuit board is subject to shocks, which increases the possibility of being damaged relative to installed power supply apparatuses.

SUMMARY OF THE INVENTION

According to an aspect of the present invention, a power supply apparatus includes first and second spaced apart panels disposed in parallel with each other. Partitioning means extends substantially perpendicularly with and between the first and second panels, with two opposed ends of the partitioning means joined to the first and second panels, respectively, so that the space between the first and second panels is divided into first and second regions. Power supply means includes a first heat-generating electric component disposed in the first region, and a non-heat-generating electric component disposed in the second region.

The first and second panels may have substantially the same shape and configuration, and third and fourth panels having substantially the same shape and configuration may be used, too. The third and fourth panels extend substantially perpendicularly to the first and second panels so that the first and second regions are surrounded by the panels.

The partitioning means may include an opening through which the first and second regions can communicate with each other. Heat sink means is disposed in the first region side of the partitioning means to substantially cover the opening. A second heat-generating electric component is mounted on the heat sink means.

The second heat-generating electric component may include a semiconductor module in which power semiconductor switching means for switching DC power at a high frequency is disposed. The module is mounted on the heat sink means and extends through the opening in the partitioning means to thereby locate in the second region.

The non-heat-generating components may include components electrically connected to the semiconductor module and may be disposed near the semiconductor module.

Components to be electrically connected to the semiconductor module may be disposed on a printed circuit board. The printed circuit board includes terminal fixing means electrically connected to the components, and through-holes formed in the printed circuit board in the vicinity of the terminal fixing means. The semiconductor module has terminals adapted to be inserted into the through-holes and fixed by the terminal fixing means.

The first and second panels and the partitioning means may be joined together by means of first engaging means mounted on the first and second panels, and second engaging means mounted on the partitioning means to engage with the first engaging means.

According to another aspect of the present invention, a power supply apparatus includes first and second panels and partitioning means. The first panel includes a first opening therein at a location corresponding to a first region through which the first region can communicate with the exterior, and also a second opening therein at a location corresponding to a second region through which the second region can communicate with the exterior. The second panel includes a third opening at a location corresponding to the first region through which the first region can communicate with the exterior. The partitioning means includes a fourth opening through which the first and second regions can communicate with each other. Power supply means includes a heat-generating component disposed substantially in the first region, and a non-heat-generating component disposed in the second region. Air-blowing means is disposed in the first region. The air-blowing means causes air to flow from or to the first opening to or from the third opening, and from or to the second opening to or from the third opening through the fourth opening.

According to this aspect, a plurality of heat-generating components may be arranged from a location near the first opening toward the third opening.

Further, heat sink means may be disposed in the first region side of the fourth opening with a spacing therebetween. The heat-generating component may include DC-to-AC power converting means for converting DC power to AC power, voltage lowering means for lowering the output voltage of the DC-to-AC converting means, and AC-to-DC converting means for converting the output voltage of the voltage lowering means to DC. The DC-to-AC converting means may be mounted on the heat sink means on its fourth opening side.

According to still another aspect of the present invention, a power supply apparatus includes input-side AC-to-DC converting means for converting AC power to DC power, inverter means for converting the DC power to high frequency power, and output-side AC-to-DC converting means for converting the high frequency power to DC power. The inverter means is disposed in the semiconductor module.

The input-side AC-to-DC converting means may include input-side rectifying means and smoothing means. The input-side rectifying means is disposed in the semiconductor module.

The output-side AC-to-DC converting means may include output-side rectifying means and smoothing means. The output-side rectifying means is disposed in the semiconductor module.

The power supply apparatus may include first and second spaced apart panels disposed substantially in parallel with each other, and partitioning means having its opposed ends joined to the first and second panels, respectively, to thereby divide the space between the first and second panels into first and second regions. The partitioning means includes an opening through which the first and second regions can communicate with each other. Heat sink means may be attached to the opening in its first region side. The semiconductor module is disposed on the second region side of the heat sink means. The output-side AC-to-DC converting means includes output-side rectifying means and smoothing means, and the output-side rectifying means is disposed in the first region.

DETAILED DESCRIPTION OF PREFERRED EMBODIMENTS

Figure 1:
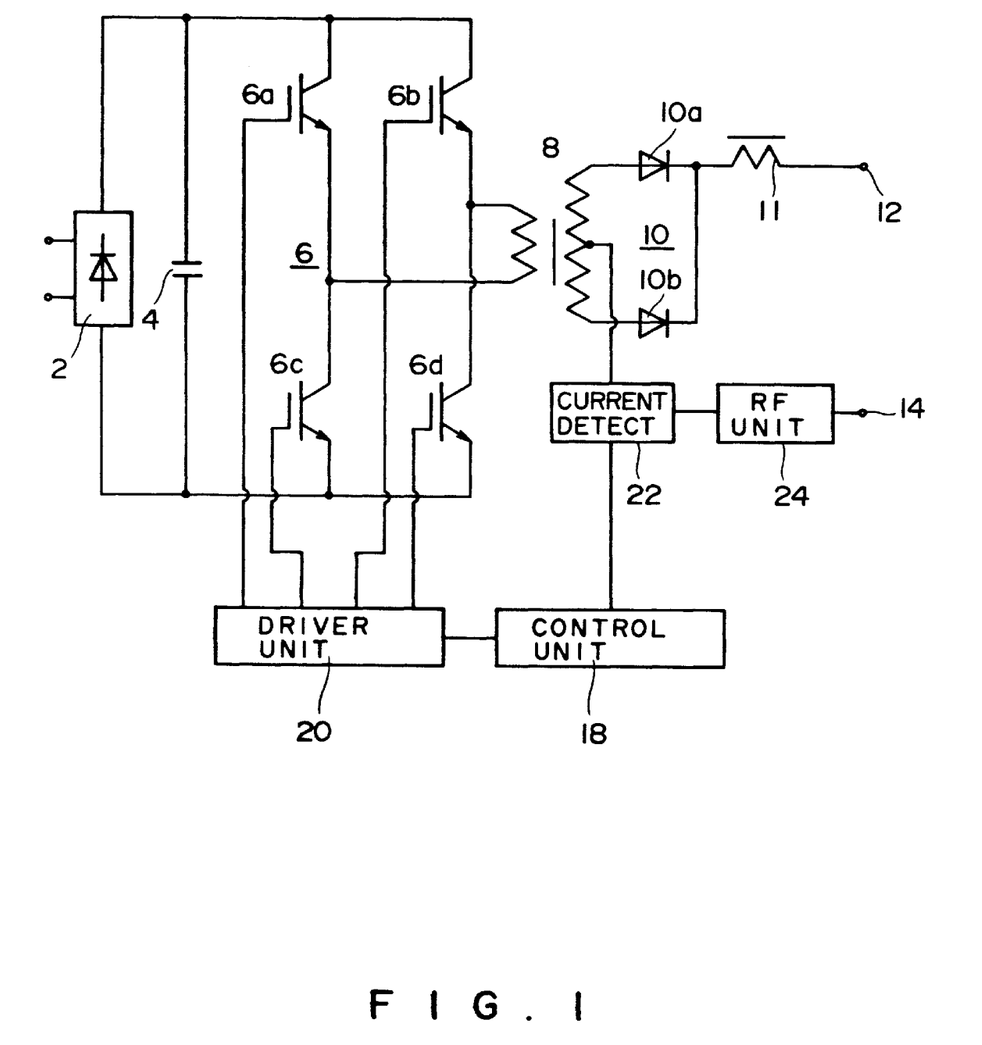
FIG. 1 is a block diagram of a plasma arc cutter including power supply apparatus according to a first embodiment of the present invention.

A power supply apparatus according to a first embodiment of the present invention may be used with a plasma arc cutter. As shown in FIG. 1, the power supply apparatus is arranged such that commercial AC power is converted into DC power by being rectified by an input-side rectifier 2 and smoothed by a smoothing capacitor 4. The DC power is converted into high-frequency power by an inverter 6 including power semiconductor switching elements 6a, 6b, 6c, and 6d which are connected in a bridge configuration and are switched at a high frequency. The switching elements 6a, 6b, 6c, and 6d may be transistors, IGBT (insulated gate bipolar transistors), MOSFET's, or the likes. As is known, the inverter 6 includes flywheel diodes connected in parallel with the respective switching elements 6a–6d, but they are not shown.

The high frequency power from the inverter 6 is lowered by a voltage lowering transformer 8, and the lowered high-frequency power is, then, rectified by an output-side rectifier 10 including rectifying diodes 10a and 10b and smoothed by a smoothing reactor 11. The smoothed power is developed between output terminals 14 and 16.

The power semiconductor switching elements 6a–6d are driven by a driver unit 20 which operates in response to a control signal from a control unit 18. The control unit 18 detects current flowing through a load connected between output terminals 12 and 14 by means of a current detector 22, and controls the respective power semiconductor switching elements 6a–6d in such a manner as to maintain the current at a predetermined reference value, i.e. constant. In place of the current detector 22, a voltage detector detecting a load voltage may be used to control the voltage to be constant, or both a current detector and a voltage detector may be used to control power to be constant.

A load to be connected between the output terminals 12 and 14 may include, for example, a torch and a base metal. Since there is a gap between them, an arc cannot be generated simply by applying a DC voltage between the torch and the base metal. For initiating plasma arc cutting, an RF (radio frequency) unit 24 is used to generate an arc.

The power supply apparatus with the above-described arrangement is assembled and housed in a housing 26 as illustrated in FIGS. 2–14.

The housing 26 includes a first panel, e.g. front panel 100, a second panel, e.g. rear panel 200, partitioning means, e.g. chassis 300, a third panel, e.g. left side cover 400, and a fourth panel, e.g. right side cover 500.

Figure 2:
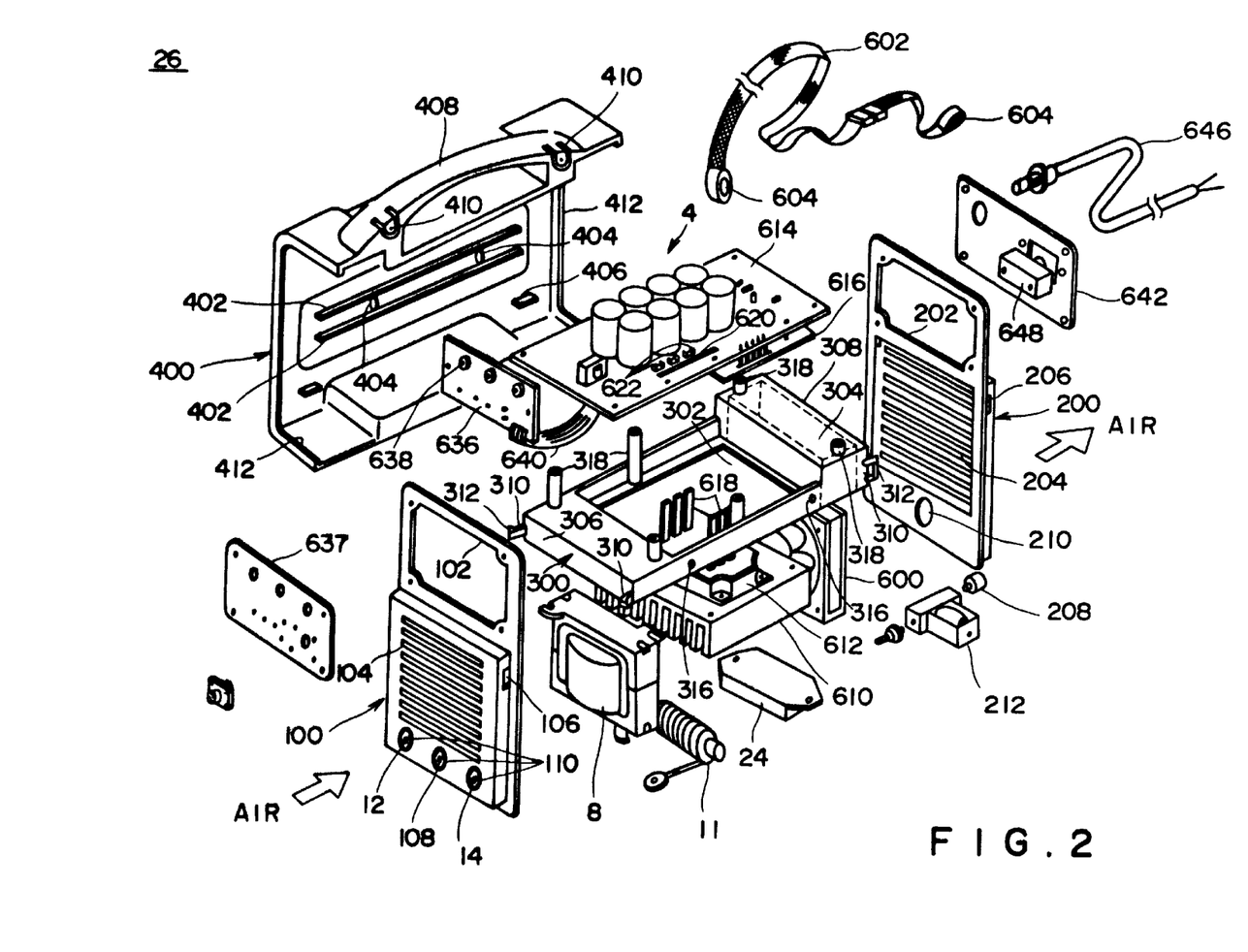
FIG. 2 is an exploded view of the plasma arc cutter shown in FIG. 1.

The front and rear panels 100 and 200 are made of, for example, thermoplastic resin, and are spaced from and in parallel with each other, as shown in FIG. 2. The panels 100 and 200 have a planar, rectangular shape, with the lateral sides longer than the top and bottom sides. In the upper portions of the panels 100 and 200, openings 102 and 202 are formed respectively, and in the middle portions of the panels 100 and 200, there are formed a plurality of passages 104 and 204, respectively, through which cooling air can be blown. On the left and right sides of the middle portion of the panels 100 and 200, first engaging means, e.g. through-holes or slots 106 and 206, respectively. The openings 102 and 202, the passages 104 and 204, and the through-holes 106 and 206 have the same shapes and formed in the same locations in the respective panels 100 and 200. The front panel 100 includes further three openings 110 for the two output terminal 12 and 14, and for a plasma arc generating gas flow-out terminal 108. The openings 110 are formed in the lower portion of the panel 100. The rear panel 200 includes an opening 210 in its lower portion for connecting a plasma arc generating gas flow-in terminal 208.

Figure 7:
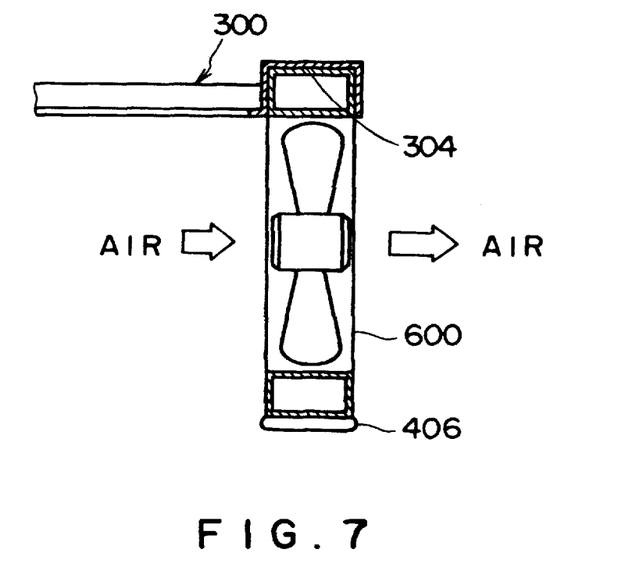
FIG. 7 shows how a fan is coupled to the chassis in the cutter shown in FIG. 2.

The chassis 300 is coupled to the front and rear panels 100 and 200 at locations intermediate between the top and bottom sides of the panels. The chassis 300 is formed of, for example, thermoplastic resin, and has a shape of a rectangular casing opening downward, with the lateral sides longer than the front and rear sides thereof. The chassis 300 is box-shaped with a central opening 302 formed therein. Adjacent to the rear side of the opening 302, the chassis 300 includes a recess 304 opening downward which are defined by portions of the side walls, the rear wall and a wall extending in parallel with the rear wall (FIGS. 2 and 7). In the illustrated embodiment, the recess projects slightly upward so that the chassis 300 is L-shaped when viewed from the side.

Figure 3A:
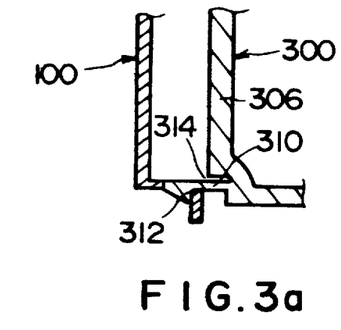
FIG. 3a is an enlarged, transverse cross-sectional view of part of the cutter of FIG. 2, in which a front panel and a chassis connected together are shown.
Figure 3B:
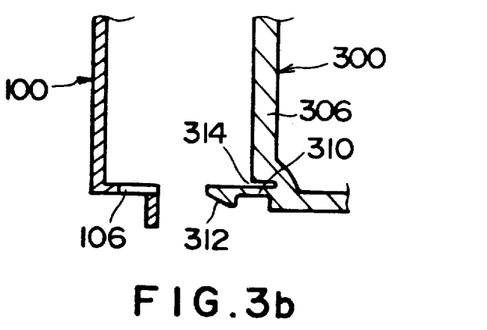
FIG. 3b is an enlarged, transverse cross-sectional view corresponding to FIG. 3a, in which the front panel and the chassis separated from each other are shown.
Figures 3C, 3D:
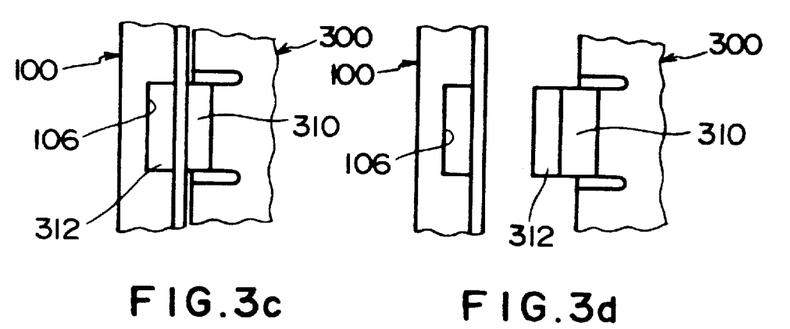
FIG. 3c is an enlarged, side view of part of the cutter of FIG. 2 in which the front panel and the chassis connected together are shown.
FIG. 3d is an enlarged, side view corresponding to FIG. 3c in which the front panel and the chassis separated from each other are shown.

As shown in FIGS. 3a–3c, projections 310 extend forward and rearward from the left and right ends of front and rear end members 306 and 308 of the chassis 300, respectively. Each of the projections 310 has second engaging means, e.g. a protrusion 312 protruding outward from the tip end of that projection. In order to make the projections 310 possible to bend inward, slots 314 are formed in the front and rear members 306 and 308, as shown in FIGS. 3a and 3b.

The protrusions 312 engage with the through-holes 106 and 206 in the front and rear panels 100 and 200, respectively. For example, the protrusion 312 at the front, right-hand corner of the chassis 300 engage with the through-holes 106 formed in the right-hand edge of the front panel 100, as shown in FIGS. 3a and 3c. Although not shown, the remaining protrusions 312 engage with their associated through-holes 106 and 206 in the front and rear panels 100 and 200, respectively, in the same manner.

Thus, the chassis 300 is joined to the front and rear panels 100 and 200, to thereby form an H-shaped assembly with the panels 100 and 200.

For detaching the front and rear panels 100 and 200 from the chassis 300, the protrusion 312 shown, for example, in FIG. 3a, is pushed inward by a finger and the panels are pulled off, as shown in FIGS. 3b and 3d. Because the projections 310 are of thermoplastic resin, they are elastically deformed by being pushed inward and, therefore, the protrusions 312 can be disengaged easily from the through-holes 106 and 206.

Figure 4:
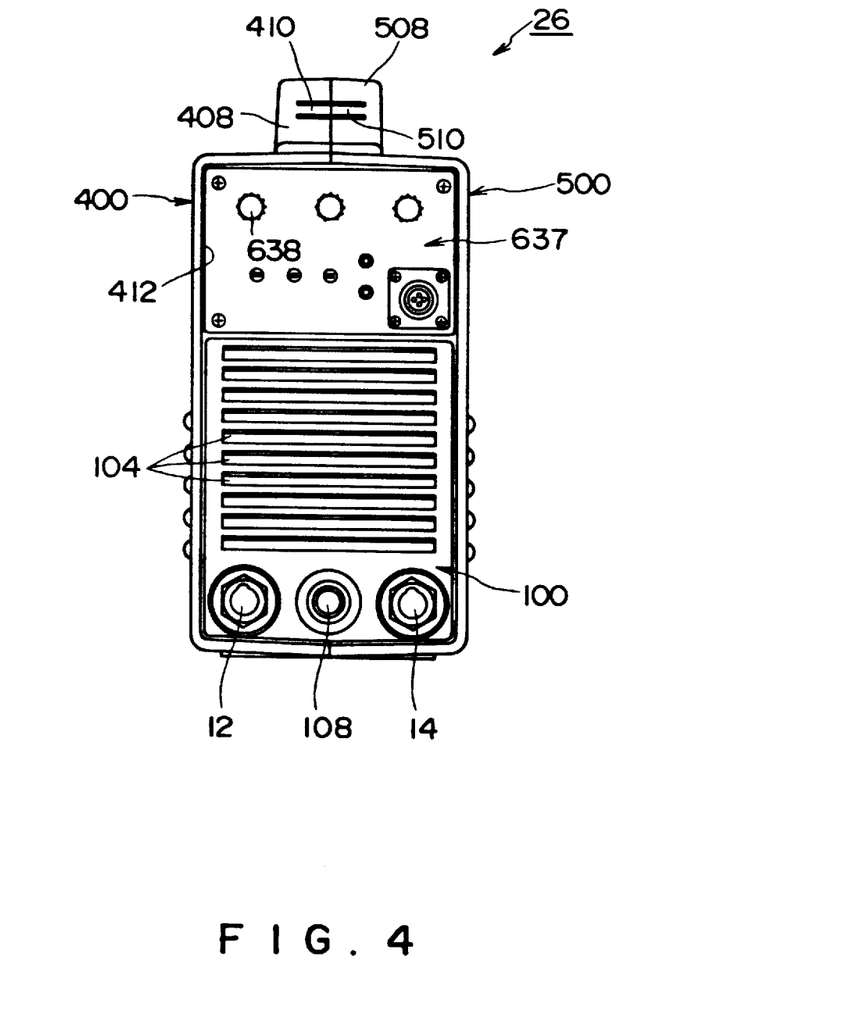
FIG. 4 is a front view of the plasma arc cutter shown in FIG. 2.
Figure 5:
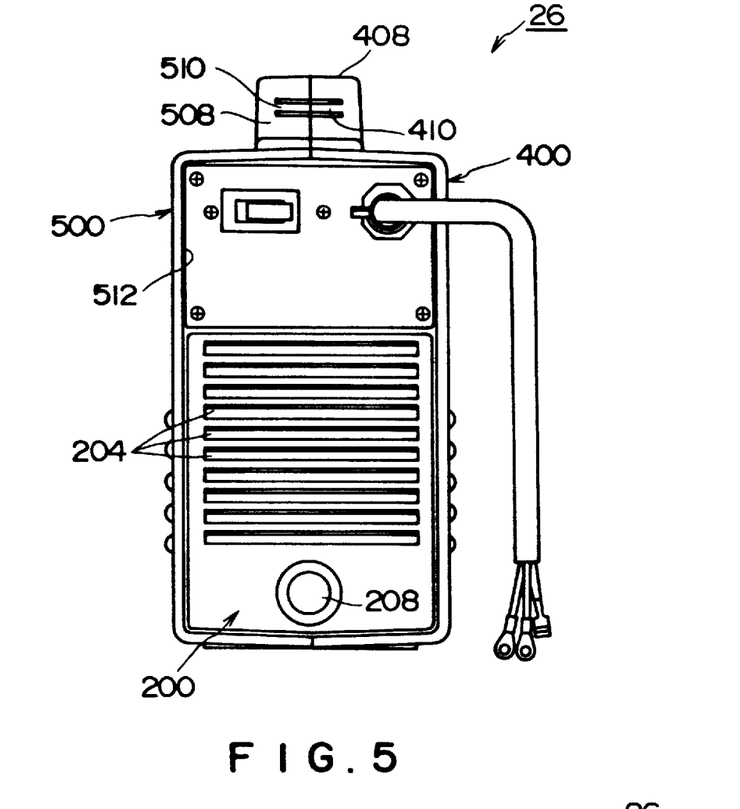
FIG. 5 is a rear view of the plasma arc cutter shown in FIG. 2.
Figure 6:
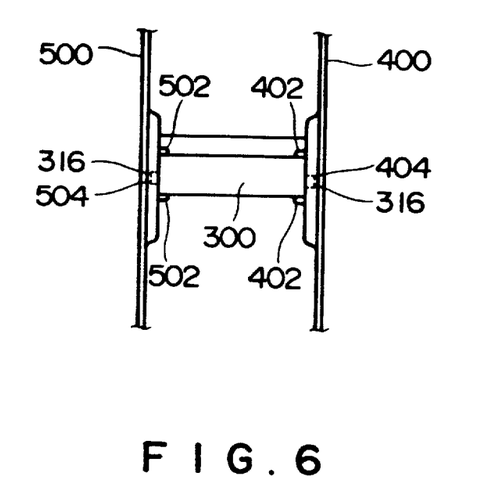
FIG. 6 is a rear view of the cutter with the front and rear panels removed.

The left side cover 400 has a generally U-shaped cross-section as shown in FIG. 2, and the right side cover 500 has a shape which is same as and symmetric with the left side cover 400. The two side covers 400 and 500, when joined together as shown in FIGS. 4 and 5, a casing having a rectangular cross-section is formed. On the inside surface of the left side cover 400, a pair of vertically spaced parallel ridges 402 extend along the length direction of the cover, as shown in FIG. 2. Similarly, a pair of vertically spaced parallel ridges 502 extend along the length direction of the right side cover 500. As shown in FIG. 6, the left-hand side edge of the chassis 300 are snugged between the ridges 402, and the right-hand side edge of the chassis 300 is snugged between the ridges 502, whereby the chassis 300 are restricted in its movement in the vertical direction.

As shown in FIG. 2, in the inside surface of the side cover 400, between the ridges 402, two depressions 404 are formed, and, two depressions 504 are formed in the inside surface of the side cover 500 between the ridges 502. The chassis 300 has two positioning protuberances 316 on each of the side surfaces of the chassis 300, and these protuberances 316 fit in with the associated depressions 504. Thus, the chassis 300 is positioned in place with respect to the side covers 400 and 500.

In the recess 304 in the chassis 300 (FIG. 7), air-blowing means, e.g. a cooling fan device 600 is mounted to blow air drawn in through the cooling air passages 104 out through the cooling air passages 204. The fan device 600 has its upper portion fitted into the recess 304 and fixed therein. In order to prevent the fan device 600 from slipping down from the recess 304, support members 406 and 506 are formed to protrude from the inside surfaces of the side covers 400 and 500 (FIGS. 1 and 7). The bottom surface of the cooling fan device 600 is in contact with and supported by the support members 406 and 506.

Figure 8:
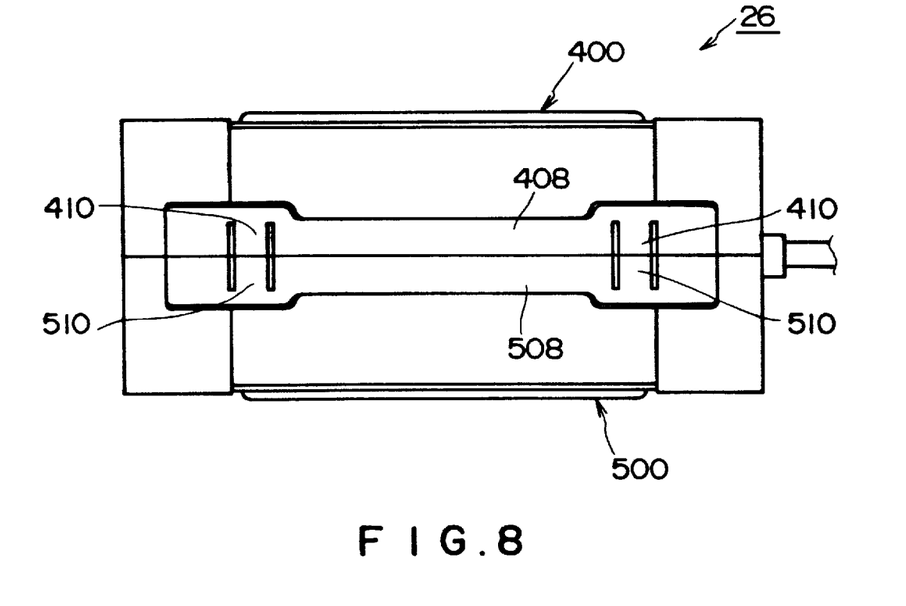
FIG. 8 is a plan view of the plasma arc cutter of FIG. 2.

As shown in FIG. 8, the left and right side covers 400 and 500 have handle halves 408 and 508, respectively, on the respective upper surfaces. The handle halves 408 and 508 form together a handle when the side covers 400 and 500 are joined together. At the respective ends of each handle halves 408 and 508, hook receivers 410, 510 are formed to receive loops 604 formed at the two ends of a belt 602 shown in FIG. 2. The belt 602 and the handle are used to carry the power supply apparatus.

Inwardly projecting peripheral ridges 412 and 512 are formed along the front and rear edges of the left and right side covers 400 and 500. The inner surfaces of the peripheral ridges 412 and 512 are to contact the outer peripheral surfaces of the front and rear panels 100 and 200, when assembled, so that the front and rear panels 100 and 200 are prevented from removed.

Figure 9:
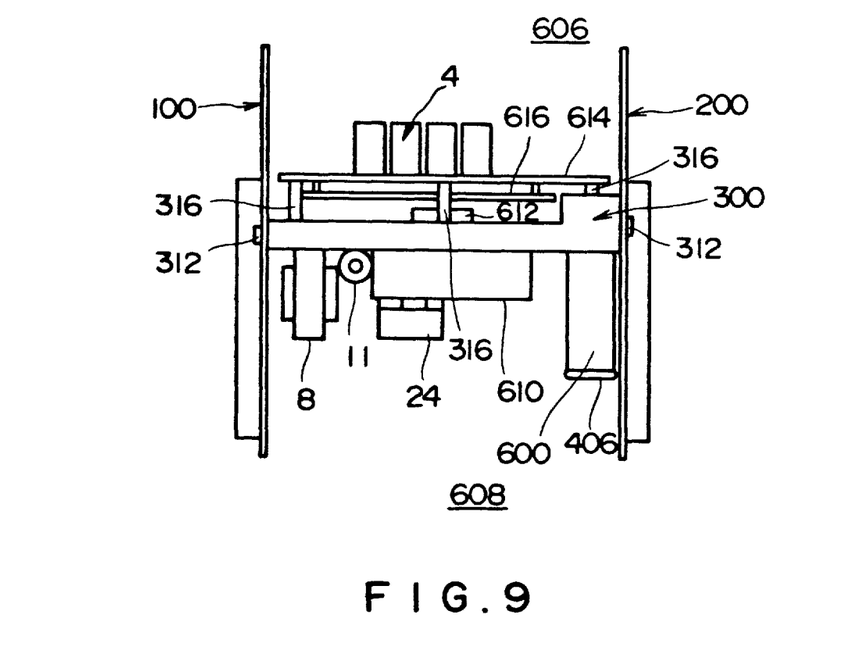
FIG. 9 is a side elevational view of the cutter of FIG. 2 with right and left side covers removed.

As is seen from FIG. 9, the chassis 300 divides the interior of the housing 26 into first and second regions, namely, an upper region 606 and a lower region 608 which are in communication with each other via the opening 302 in the chassis 300.

Heat dissipating means or heat sink 610 is mounted on the bottom surface of the chassis 300 by appropriate means to close the opening 302. The voltage-lowering transformer 8 and the smoothing reactor 11, which are heat-generating components, are mounted on the bottom surfaces of the chassis 300 by appropriate means so that these components are located in the lower region 608. The RF unit 24 is mounted on the bottom surface of the heat sink 610. The transformer 8, the reactor 11, and the RF unit 24 are arranged in the named order from the front panel side toward the rear panel side. When the cooling fan device 600 is operated, air can flow over the transformer 8, the reactor 11, and the RF unit 24 in the named order, and, then, is blown out through the passages 204, whereby these components are cooled.

On the top surface of the heat sink 610, which is exposed to the upper region 606 through the opening 302, a power semiconductor module 612 is mounted, as shown in FIG. 2. The semiconductor module 612 includes built-in devices, such as the input-side rectifier circuit 2, the semiconductor switching elements 6a–6c of the inverter 6, the flywheel diodes, the output-side rectifier circuit 10, and the driver unit 20. The semiconductor module 612 is also a heat-generating component. Heat generated by the semiconductor module 612 is conducted via the heat sink 610 to the lower region 608 and is removed by air blown by the cooling fan device 600.

Within the upper region 606, a main printed circuit board 614 on which components, such as the smoothing capacitor 4, are mounted is disposed. The main printed circuit board 614 is supported on the top surfaces of six bosses 318 which extend upward from the top surface of the chassis 300. A control printed circuit board 616 including the control unit 18 is attached to the bottom surface of the main printed circuit board 614. The main and control printed circuit boards 614 and 616 hardly generate heat, and, therefore, they can classified as non-heat-generating components. Although the control printed circuit board 616 is located close to the semiconductor module 612, heat generated by the semiconductor module 612 does not cause erroneous operation of the control unit 18 on the control circuit board 616 because it is conducted to the lower region 608 as described above.

Figure 10:
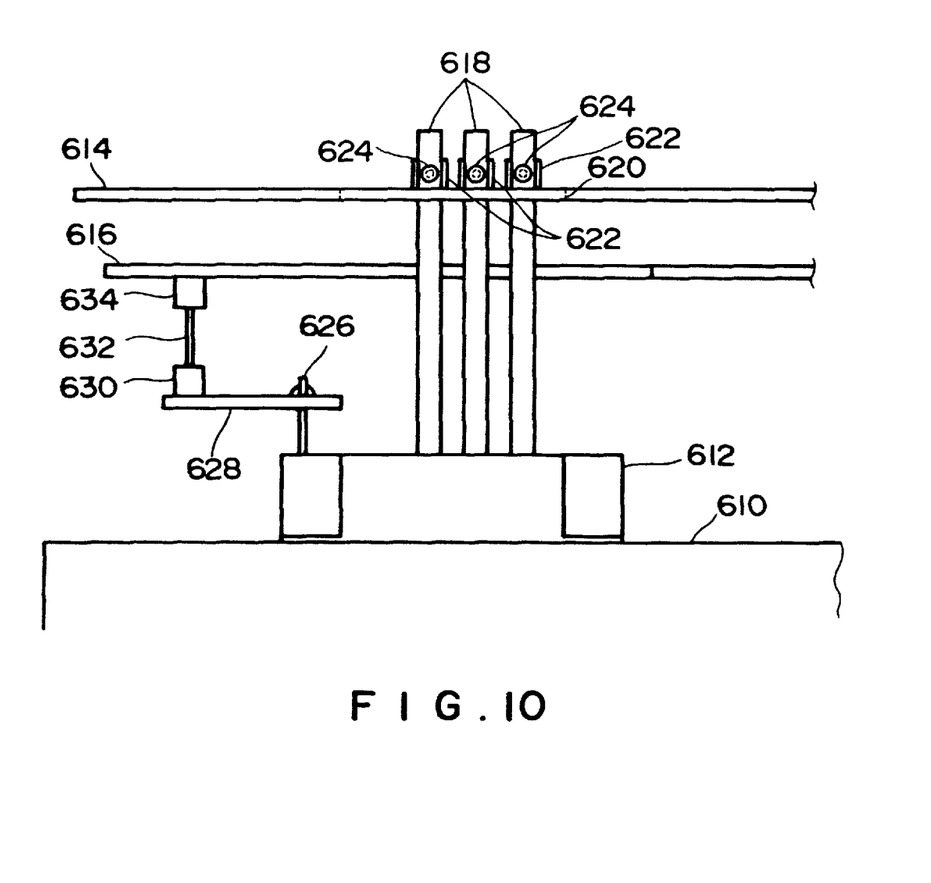
FIG. 10 is an enlarged side elevational view of the cutter of FIG. 2 illustrating how a power semiconductor module, a main printed circuit board, and a control printed circuit board are connected.
Figure 11:
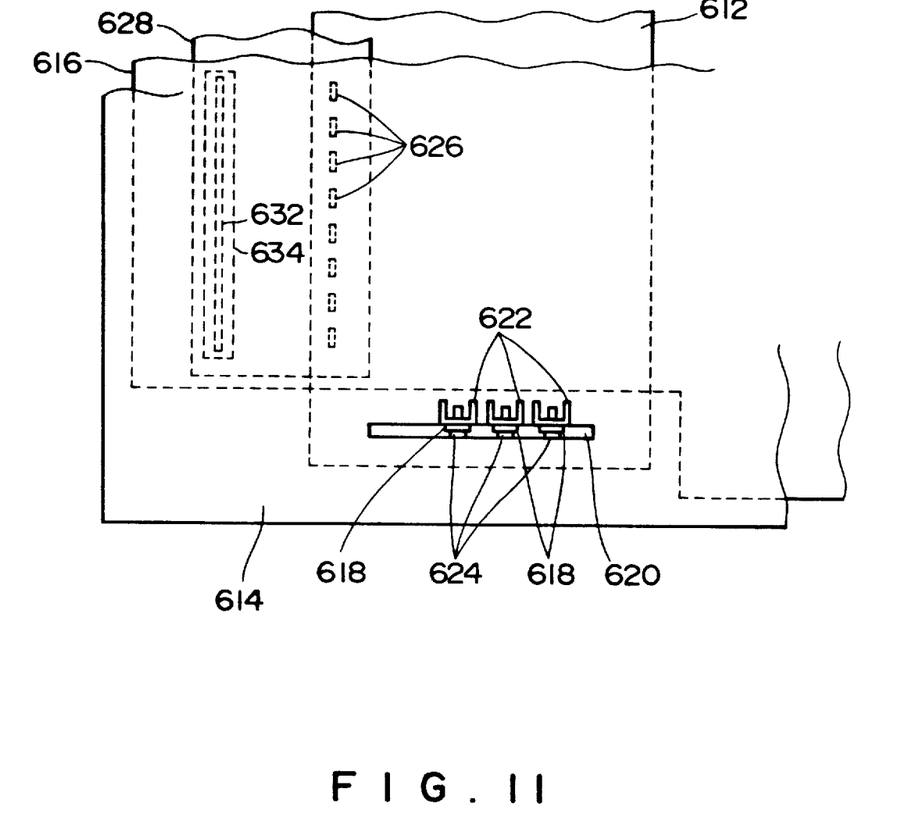
FIG. 11 is an enlarged plan view of part of the cutter of FIG. 2, corresponding to FIG. 10, illustrating how the power semiconductor module, the main printed circuit board, and the control printed circuit board are connected.

Two sets of main terminals, each including three main terminals 618, are spaced on the top surface of the semiconductor module 612, as shown in FIG. 2. The main terminals 618 extend upward through slots 620 formed in the main printed circuit board 614 at locations corresponding to the respective terminals 618. The tip ends of the respective terminals 618, after inserted into the slots 620, are connected to terminal fixers 622 mounted on the top surface of the printed circuit board 614 along the slots 602, as shown in FIG. 10. The connection of the terminals 618 to the fixers 622 is provided, as shown in FIGS. 10 and 11, by inserting a screw 624 into a hole formed in the tip end of each terminal 618 and screwing it into a screw hole in the associated terminal fixer 622. The terminal fixers 622 are electrically connected to the components, such as the smoothing capacitor 4, on the main printed circuit board 614. The electrical connection between the main terminals 618 and the terminal fixers 622 may be provided by means of plug-receptacle assemblies, or connectors.

As is seen from FIGS. 10 and 11, a plurality of control terminals 626, too, extend upward from the top surface of the semiconductor module 612. The control terminals 626 are inserted into associated through-holes formed in an auxiliary printed circuit board 628 and are electrically connected to a plurality of lines formed on the auxiliary printed circuit board 628. Each of the lines is electrically connected to a predetermined circuit on the control printed circuit board 616 via a connector 630, a bridging flat cable 632 and a connector 634.

An operating printed circuit board through which an operator can operate the apparatus is attached, together with a cover plate 637, to close the opening 102 in the front panel 100. A switch 638 and other components are mounted on the board 636, which are electrically connected by wires 640 to circuits on the control printed circuit board 616.

An AC power input board 642 is attached to the rear panel 200 in such a manner to close the opening 202 in the rear panel 200. A power supply cable 646, a power supply switch 648 and other components are disposed on or connected through the board 642.

An electromagnetic valve 212 is connected to the plasma arc generating gas flow-in terminal 208 to open and close the passage for the gas flowing into the apparatus. The valve 212 is also coupled to the gas flow-out terminal 108 on the front panel 100 via a joint and piping.

Since the front panel 100, the rear panel 200 and the chassis 300 form an H-shaped structure, the housing 26 is strong and hardly deformed by compression force, pulling force, bending force, and/or other forces exerted to the housing 26 in any directions. Power supply apparatus of potable type frequently receives shocks while it is being carried, the apparatus can be protected from damages which could be caused by such shocks.

Heat-generating components and non-heat-generating components are isolated from each other by means of the chassis 300 and the heat sink 610, heat generated by heat-generating components, for example, by the RF unit 24 is hardly conducted to non-heat-generating components, which can prevent erroneous operation of non-heat-generating components, for example, the control unit 18 which otherwise could be caused by the heat. Since the heat sink 610 is disposed on the chassis 300, it never occurs that the main printed circuit board 614 may be damaged due to the weight of the heat sink 610.

Positioning the heat-generating components on the bottom surface of the chassis 300, while the non-heat-generating components on the top surface, enables easy maintenance or inspection of the circuits and components after removing one or both of the side covers 400 and 500.

The lower region 608 in which heat-generating components are disposed and the upper region 606 in which non-heat-generating components are disposed are partitioned by the chassis 300 and the heat sink 610, which prevents heat generated by components other than the power semiconductor module 612 from being conducted to the upper region 606. Heat generated by heat-generating components, such as the power semiconductor module 612 and the voltage lowering transformer 8, are absorbed by the heat sink 610 and re leased into the lower region 608. Beat released from the heat sink 610 and heat generated by heat-generating components other than the semiconductor module 612 is blown out of the apparatus by the cooling fan 600.

The power semiconductor module 612 is mounted in the upper region 606 in which non-heat-generating components are disposed, but, since it is disposed on the heat sink 610, heat generated by the semiconductor module 610 is absorbed by the heat sink 610 and released into the lower region 608. Therefore, heat from the semiconductor module 608 is scarcely released into the upper region 606. Accordingly, although the heat-generating power semiconductor module 612 is disposed close to non-heat-generating components, erroneous operation of non-heat-generating components, such as the control unit 18, due to heat generated by the power semiconductor module 612 can be avoided.

On the other hand, since the power semiconductor module 612 is disposed close to the main printed circuit board 614 and control printed circuit board 616, the main terminals 618, the control terminals 626, and the flat cables, for connecting the printed circuit boards 614 and 616 can be made short, which provides noise reduction.

In order to electrically connect the main terminals 618 of the semiconductor module 612 to the terminal fixers 622 on the main printed circuit board 614, the main terminals 618 are inserted into the slots 620, which eliminate necessity for extending the terminals 618 around the periphery of the printed circuit board 614 and, therefore, enables the use of short terminals. This, in turn, reduces wiring inductance. The use of the terminal fixers 622, the main terminals 618 can be easily connected.

The panels 100 and 200 and the chassis 300 can be easily joined or separated without need for using any tools, since they can be joined by simply engaging or disengaging the protrusions 312 of the chassis 300 with or from the through-holes 106 and 206 of the panels 100 and 200.

The chassis 300 has its side edges snugly inserted between the ridges 402 in the cover 400 and between the ridges 502 in the cover 500. Thus, the left and right side covers 400 and 500 and the chassis 300 are easily assembled or disassembled without using any tools. The ridges 402 and 502 can securedly hold the chassis 300 with respect to the side covers 400 and 500.

Figure 12A:
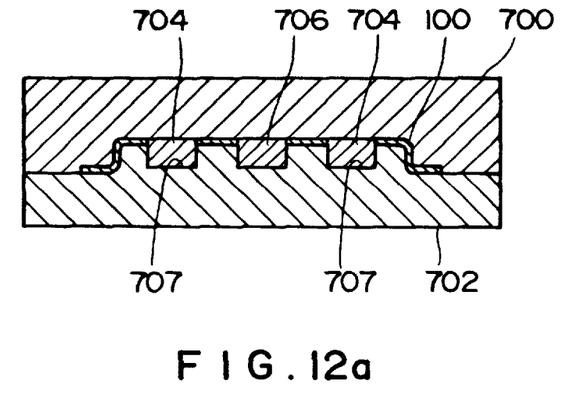
FIG. 12a is a cross-sectional view of a mold which may be used to produce a front panel of the plasma arc cutter of FIG. 2.
Figure 12B:
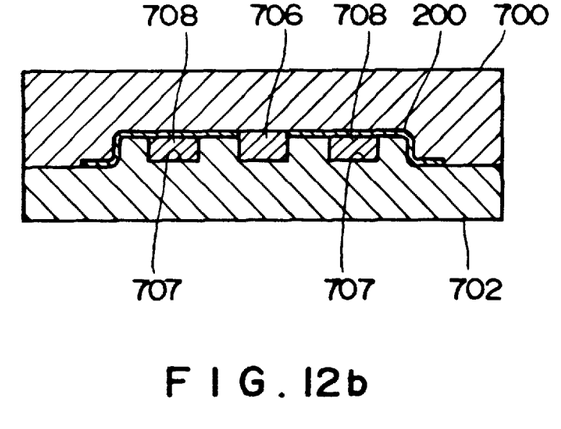
FIG. 12b is a cross-sectional view of a mold which may be used to produce a rear panel of the plasma arc cutter of FIG. 2.

Next, referring to FIGS. 12a and 12b, how to manufacture the front and rear panels 100 and 200 is described.

The panels 100 and 200 are manufactured by means of a plastic molding machine with injection molds.

As shown in FIG. 12a, the front panel 100 is manufactured by means of an upper first mold 700, a lower first mold 702, and two first removable molds 704 and a second removable mold 706. The first removable molds 704 are for forming two outer ones of the three openings 110 in the lower portion of the panel 100. The central opening 110 is formed by the second removable mold 706 disposed at the lower center portion of the lower first mold 702 shown in FIG. 12a. The two first removable molds are removably placed in recesses 707 formed in the lower first mold 702.

The upper first mold 700 may be mounted on a movable base with the lower first mold 702 secured to a stationary base. Molding material, which is a melt of thermoplastic synthetic resin, is injected via an injection port (not shown) into a cavity defined by the upper first mold 700, the lower first mold 702, the two first removable molds 704, and the second removable mold 706. Then, the molding material is cooled, and, thereafter, the upper first mold 700 is moved upward together with the movable base, and the molded front panel 100 is removed. The front panel 100, thus, has the three openings 110 therein as shown in FIG. 2.

FIG. 12b illustrates how the rear panel 200 can be fabricated. For the fabrication of the rear panel 200, the upper first mold 700, the lower second mold 702, and the second removable mold 706 are used. In place of the two removable first molds 704 use for making the front panel 100, two third removable molds 708 are used. The two third removable molds 708 are placed to fill in the recesses 707 in the lower first mold as shown.

The molding material is injected into a cavity defined by the upper first mold 700, the lower first mold 702, the second and third removable molds 706, whereby the rear panel 200 with one opening 210 formed therein is formed.

The left and right side covers 400 and 500 have the same shape and configuration. Therefore, the both side covers 400 and 500 can be fabricated by means of an upper second mold 720 and a lower second mold 722, shown in FIG. 13.

Figure 13:
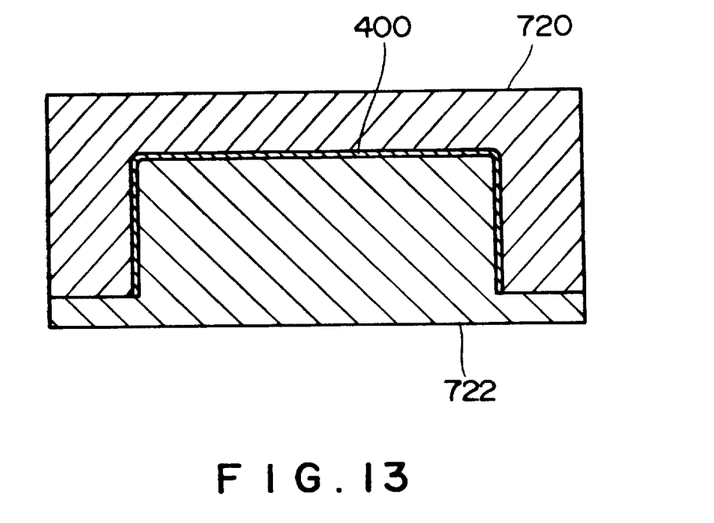
FIG. 13 is a cross-sectional view of a mold which may be used to produce left and right side covers of the plasma arc cutter of FIGURE 2.

The upper second mold 720 may be mounted to a movable base with the lower second mold 722 mounted to a stationary base. A molding material, which is a melt of thermoplastic synthetic resin, is injected via an injection port (not shown) into a cavity defined by the upper and lower second molds 720 and 722. Then, the molds are cooled, and the upper second mold 720 is moved upward to separate the upper and lower molds 720 and 722, and the completed left or right side cover 400 or 500 is removed.

According to the method illustrated in FIGS. 12a and 12b, both the front and rear panels 100 and 200, having different numbers of openings 110 or 210, can be made using the same upper and lower molds 700 and 702, attaching thereto the two first removable molds 704 and the second removable mold 706 for the front panel 100 or the two third removable molds 704 and the second removable mold 708 for the rear panel 200. This enables cost saving, because the same molds can be used for both front and rear panels 100 and 200.

Furthermore, when the rear panel 200 is to be made after the front panel 100 is formed, the same molds can be used with only the removable molds 708 substituted for the removable molds 704. Thus, mold change can be done very easily.

The second removable mold 706 may be formed integral with the lower first mold 702.

According to the method illustrated in FIG. 13, both of the left and right side covers 400 and 500 can be made with the same upper and lower second molds 720 and 722. Thus, the cost for making the molds can be reduced. In addition, there is no need for change molds for making the right side cover after making the left side cover, for example.

Many modifications are possible to the above-described embodiment. For example, although the above-described front and rear panels 100 and 200 include two and one openings, respectively, in their lower portions, a desired number of openings can be formed. For example, if no opening is necessary for passage of working gas, another third removable mold 704 may be used in place of the second removable mold 706 shown in FIGS. 12*a* and 12*b*.

In the above-described embodiment, the through-holes 106 and 206 formed in the panels 100 and 200 and the protrusions formed on the chassis 300 are used to join the panels 110 and 200 with the chassis 300, but the through-holes may be formed in the chassis 300 with the protrusions formed on the panels 100, 200.

Although the RF unit 24 has been described to be secured to the bottom surface of the heat sink 610, it may be fixed by means of receiving members formed on the inner surfaces of the left and right side covers 400 and 500.

Figure 14:
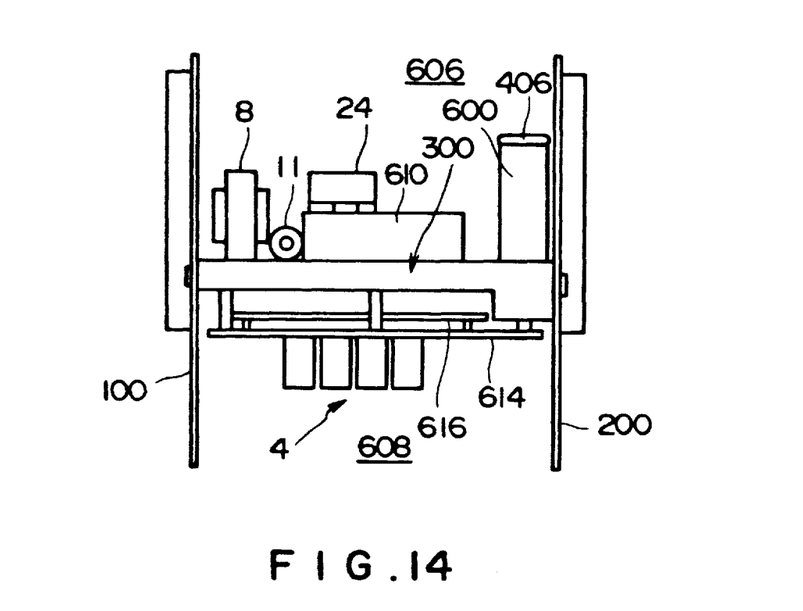
FIG. 14 is a side elevational view of a plasma arc cutter according to a modification of the first embodiment of the present invention, with left and right side covers removed.

In the above-described embodiment, heat-generating components, such as the voltage lowering transformer 8 and the RF unit 24, are disposed in the lower side of the chassis 300, and non-heat-generating components, such as the main printed circuit board 614 and the control printed circuit board 616, and the power semiconductor module 612 are disposed in the upper side of the chassis 300, but, as shown in FIG. 14, heat-generating components, such as the voltage lowering transformer 8 and the RF unit 24, may be disposed in the upper side of the chassis 300, while disposing non-heat-generating components, such as the main printed circuit board 614 and the control printed circuit board 616, and the semiconductor module 612 may be disposed in the lower side of the chassis 300.

In the described embodiment, the chassis 300 is laid horizontal, but it may be disposed vertical.

Figure 15:
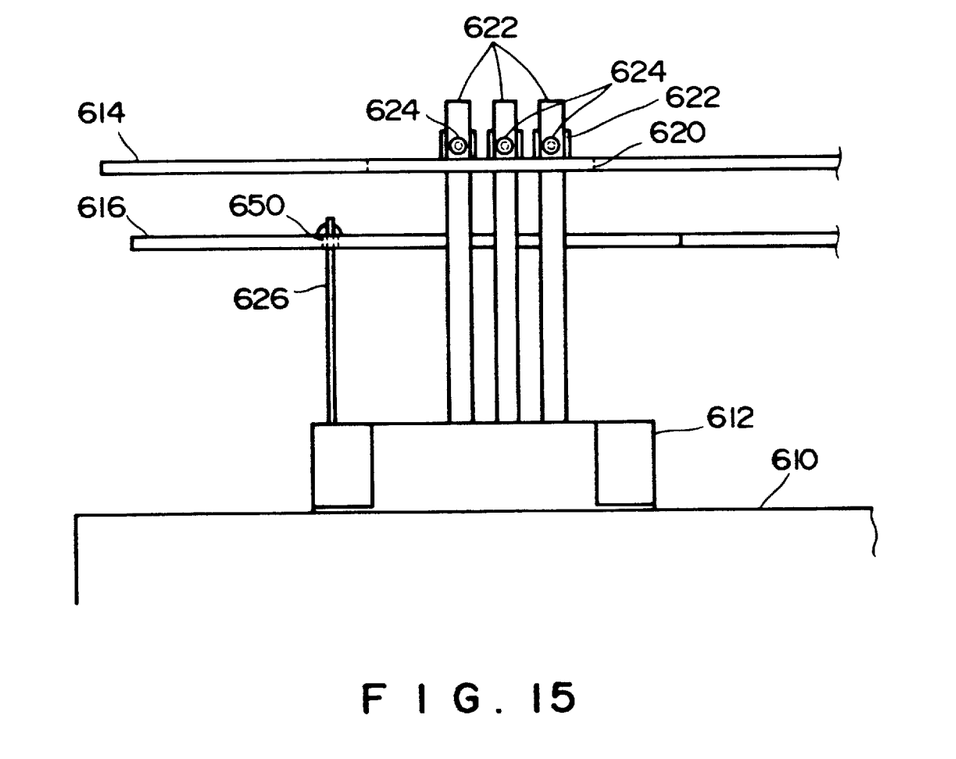
FIG. 15 is an enlarged side elevational view of the cutter illustrating how a power semiconductor module, a main printed circuit board, and a control printed circuit board are connected according to another modification of the present invention.

Instead of using the auxiliary board 628, the connectors 630 and 634, and the flat cables 632 for interconnecting the control terminals 626 of the power semiconductor module 612 and control printed circuit board 616, the tip ends of the control terminals 626 may be inserted into slots 650 formed in the control printed circuit board 616 and soldered to lines formed on the board 616. With this modification, the auxiliary printed circuit board 628, the connectors 630 and 634, and the flat cables 632 can be eliminated, and, in addition, the semiconductor module 612 can be connected to the control printed circuit board 616 with the shortest distance therebetween.

Figure 16:
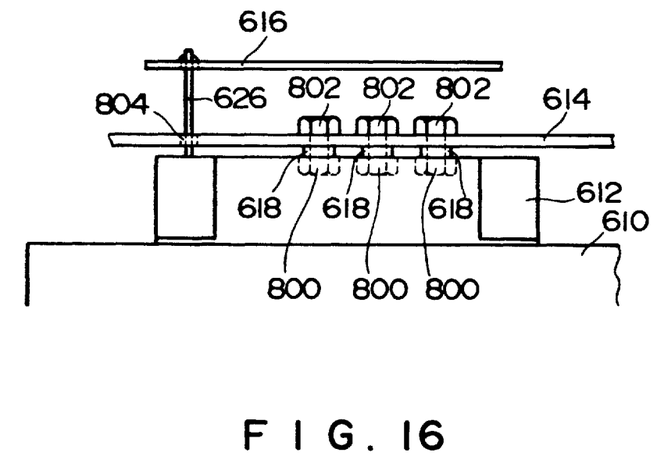
FIG. 16 is an enlarged side elevational view of the cutter illustrating how a power semiconductor module, a main printed circuit board, and a control printed circuit board are connected according to still another modification of the present invention.

Further, in the described embodiment, the main terminals 612 extend upward from the semiconductor module 612 through the slots 620 in the main printed circuit board 614 and electrically connected to the terminal fixers 622. The electrical connection of the main terminals 618 with the main printed circuit board 614 may be provided by other means, such as shown in FIG. 16. In FIG. 16, nuts 800 each having a threaded center hole therein are planted in the top surface of the semiconductor module 612 at locations corresponding to the respective main terminals 618. The terminals 618 are bent at their bases to lie over the associated nuts 800. The respective terminals 618 have through-holes formed at locations corresponding to the holes in the associated nuts 800. The main printed circuit board 614 is disposed to contact with the upper surface of the bent terminals 618. The printed circuit board 614 also includes through-holes at locations corresponding to the terminals 618 and the nuts 800. Threaded bolts 802 are screwed into the holes in the printed circuit board 614, the main terminals 618 and the center holes in the nuts 800, whereby the main terminals 618 are electrically connected to the main printed circuit board 614. In this case, the control printed circuit board 616 is disposed above the main printed circuit board 614, and the control terminals 626 of the semiconductor module 612 extend through slots 804 formed in the main printed circuit board 614 and are soldered to appropriate portions of the control printed circuit board 616.

Figure 17:
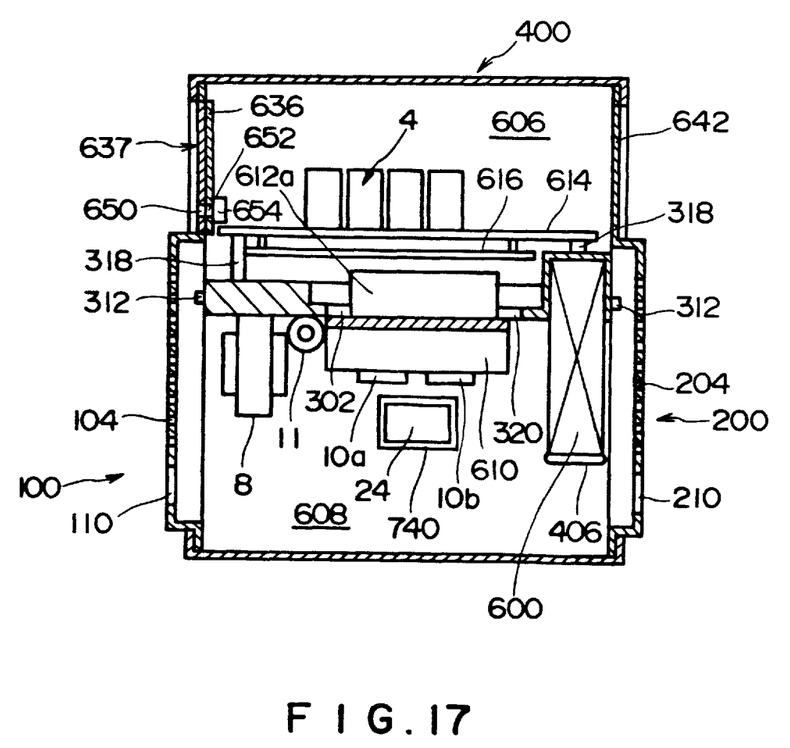
FIG. 17 is a cross-sectional view of a plasma arc cutter including a power supply apparatus according to a second embodiment of the present invention.

FIG. 17 illustrates a power supply apparatus according to a second embodiment of the present invention. The same reference numerals are attached to components similar to or same as the components of the apparatus of the first embodiment. Description of such components are not made.

According to the second embodiment, the heat sink 610 is mounted in such a manner that it does not completely close the opening 302 in the chassis 300, but it leaves a passage 320 in the rear panel side. A power semiconductor module 612*a* includes the inverter 6, the driver unit 20, the input-side rectifier circuit 2, and the flywheel diodes (not shown). The diodes 10*a* and 10*b* of the output-side rectifier circuit 10 are mounted on the bottom surface of the heat sink 610. The RF unit 24 is disposed below the heat sink 610 and is held in place by holders 740 formed on the inner surfaces of the covers 400 and 500.

In the lower portions of the operating printed circuit board 636 and the associated cover 637 which are secured to the front panel 100, slots 650 and 652 are formed in alignment with each other for making the upper region 606 in the housing 26 communicate with the exterior. The slots 650 and 652 extend in the direction along the width of the front panel 100. In order to prevent dust from entering into the upper region 606 through the slots 650 and 652, a filter 654 is attached to the front panel 100 to cover the slots 650 and 652.

When the cooling fan device 600 is energized, air introduced into the housing 26 through cooling air passages 104 flows over the voltage lowering transformer 8, the reactor 11, the RF unit 24, the output-side rectifier diodes 10*a* and 10*b* mounted on the heat sink 610, and the power semiconductor module 612*a* to remove heat from them, and is blown out of the housing through the passages 204 in the rear panel 200.

Because of the slots 650 and 652 and the passage 320, the lower region 608 is in communication with the exterior of the housing via the slots 650 and 652, the upper region 606, and the passage 320. Accordingly, upon energization of the cooling fan device 600, air introduced through the slots 650 and 652 into the upper region 606 flows over the smoothing capacitor 4 etc. on the main printed circuit board 614, the control unit 18 on the control printed circuit board 616, and the semiconductor module 612 to cool these components, then, enters into the lower region 608 through the passage 320, passes through the cooling fan device 600 and is blown out through the passages 204 in the rear panel 200.

With the above-described arrangement, not only the voltage lowering transformer 8, the reactor 11, the RF unit 24, and the output-side rectifier diodes 10*a* and 10*b* in the lower region 608, but also the smoothing capacitor 4, the control unit 20, the semiconductor module 612*a* etc. which are in the upper region 606 are cooled. This cooling is done by only one fan 600, and there is no need for using separate fans for the upper and lower regions 606 and 608. Further, in order for the single fan device 600 in the lower region 608 to be able to cool the components in the upper region 606, the two regions must be in communication. But, no dedicated opening need be formed in the chassis 300, because such communication can be made through the passage 320.

Many modifications may be possible for the power supply apparatus of the second embodiment. For example, the semiconductor module may included therein the output-side rectifier diodes 10*a* and 10*b*, and the input-side rectifier circuit 2 may be mounted on the bottom surface of the heat sink 610. Air may be introduced through the passages 204 and blown out through the passages 104 and the aligned slots 650 and 652. Further, a plurality of slots like the slots 650 and 652 may be formed.

What is claimed is:

1. A power supply apparatus comprising:

first and second spaced, substantially parallel panels;

a partition disposed substantially perpendicular to and between said first and second panels and having its two opposed edges coupled to respective ones of said first and second panels at locations thereon intermediate between the top and bottom edges of said first and second panels to thereby form an H-shaped structure with said first and second panels, said partition dividing the space between said first and second panels into first and second regions; and a power supply including a first heat-generating electric component disposed in said first region, and an electric component disposed in said second region and generating a smaller amount of heat than said first heat-generating electric component.

2. The power supply apparatus according to claim 1 wherein said first and second panels have substantially the same shape.

3. The power supply apparatus according to claim 1, wherein there are further provided third and fourth panels of substantially the same shape, each of said third and fourth panels having a generally U-shaped cross-section, the tip ends of the legs of one of said U-shaped panels abutting against the tip of the corresponding legs of the other U-shaped panel to thereby form a rectangular tubular casing, the open ends of said rectangular tubular casing being closed by said first and second panels, whereby a housing is formed.

4. The power supply apparatus according to claim 1 wherein:

said partitioning means includes an opening therein through which said first and second regions are in communication with each other;

heat sink means is disposed in said first region to substantially cover said opening in said partitioning means; and a second heat-generating electric component is mounted on said heat sink means.

5. The power supply apparatus according to claim 4 wherein:

said second heat-generating electric component includes a semiconductor module including therein power semiconductor switching means for high-frequency switching of DC power; and said semiconductor module is mounted on said heat sink means in such a manner as to be located in said second region.

6. The power supply apparatus according to claim 5, wherein:

said electric component generating a smaller amount of heat includes a component to be electrically connected to said semiconductor module, said component to be electrically connected to said semiconductor module being disposed in the vicinity of said semiconductor module.

7. The power supply apparatus according to claim 6 wherein:

said component to be electrically connected to said semiconductor module is disposed on a printed circuit board;

said printed circuit board includes terminal fixing means to be electrically connected to said component, and a through-hole formed therein in the vicinity of said terminal fixing means; and said semiconductor module includes a terminal to be inserted into said through-hole in said printed circuit board and fixed by means of said terminal fixing means.

8. The power supply apparatus according to claim 1 wherein said first and second panels and said partitioning means are joined together by means first engaging means disposed on said first and second panels and second engaging means disposed on said partitioning means to engage with said first engaging means.

9. A power supply apparatus comprising:

a casing including first and second spaced, substantially parallel panels;

a partition disposed substantially perpendicular to and between said first and second panels, and having its two opposed edges coupled to respective ones of said first and second panels to thereby divide the space between said first and second panels into first and second regions;

said second panel having a third opening at a location corresponding to said first region for making said first region communicate with the exterior;

said partition including a fourth opening for making said first and second regions communicate with each other;

a power supply including a heat-generating electric component disposed substantially in said first region, and an electric component disposed in said second region and generating a small amount of heat; and a single air-blower disposed in said first region for making air flow between said first and third openings, and between said second and third openings via said fourth opening.

10. The power supply apparatus according to claim 9 wherein a plurality of heat-generating components are arranged in order from a location near said first opening toward said third opening.

11. The power supply apparatus according to claim 9 wherein:

heat sink means is disposed in the first region side of said fourth opening with a spacing disposed therebetween;

said heat-generating components include DC-to-AC converting means for converting DC power to AC power, voltage-lowering means for lowering the output voltage of said converting means, and AC-to-DC converting means for converting the output power of said voltage-lowering means to DC power; and said DC-to-AC converting means is mounted on said heat sink means on its fourth opening side.

12. A power supply apparatus, comprising:

input-side AC-to-DC converting means including input-side rectifying means and first smoothing means, for converting AC power to DC power;

inverter means including a plurality of semiconductor switching devices and a plurality of flywheel diodes each connected in parallel with a respective one of said semiconductor switching devices, for converting said DC power to high-frequency power; and output-side AC-to-DC converting means including output-side rectifying means and second smoothing means, for converting said high-frequency power to DC power;

said input-side rectifying means, said semiconductor switching devices, said flywheel diodes, and said output-side rectifying means being included in a single semiconductor module.

13. The power supply apparatus according to claim 12, further comprising:

first and second spaced, substantially parallel panels;

a partition having its two opposed edges coupled to respective ones of said first and second panels at locations thereon intermediate between the top and bottom edges of said first and second panels to thereby form an H-shaped structure with said first and second panels, said partition dividing the space between said first and second panels into first and second regions, said partition including an opening through which said first and second regions communicate with each other; and a heat sink disposed in said first region and mounted to said opening in said partition to thereby cover said opening;

said semiconductor module being mounted on said heat sink on the second region side thereof.

* * * * *